C. F. KRAUSS ET AL

Aug. 5, 1930.

LOCOMOTIVE TRUCK

Re. 17,764

Original Filed April 2, 1929

3 Sheets-Sheet 1

Inventors:
Charles F. Krauss,
Henry K. Harwick
by their Attorneys
Hobson & Brown C. F. KRAUSS ET AL
Aug. 5, 1930. LOCOMOTIVE TRUCK Re. 17,764
3 Sheets-Sheet 2
Original Filed April 2, 1929
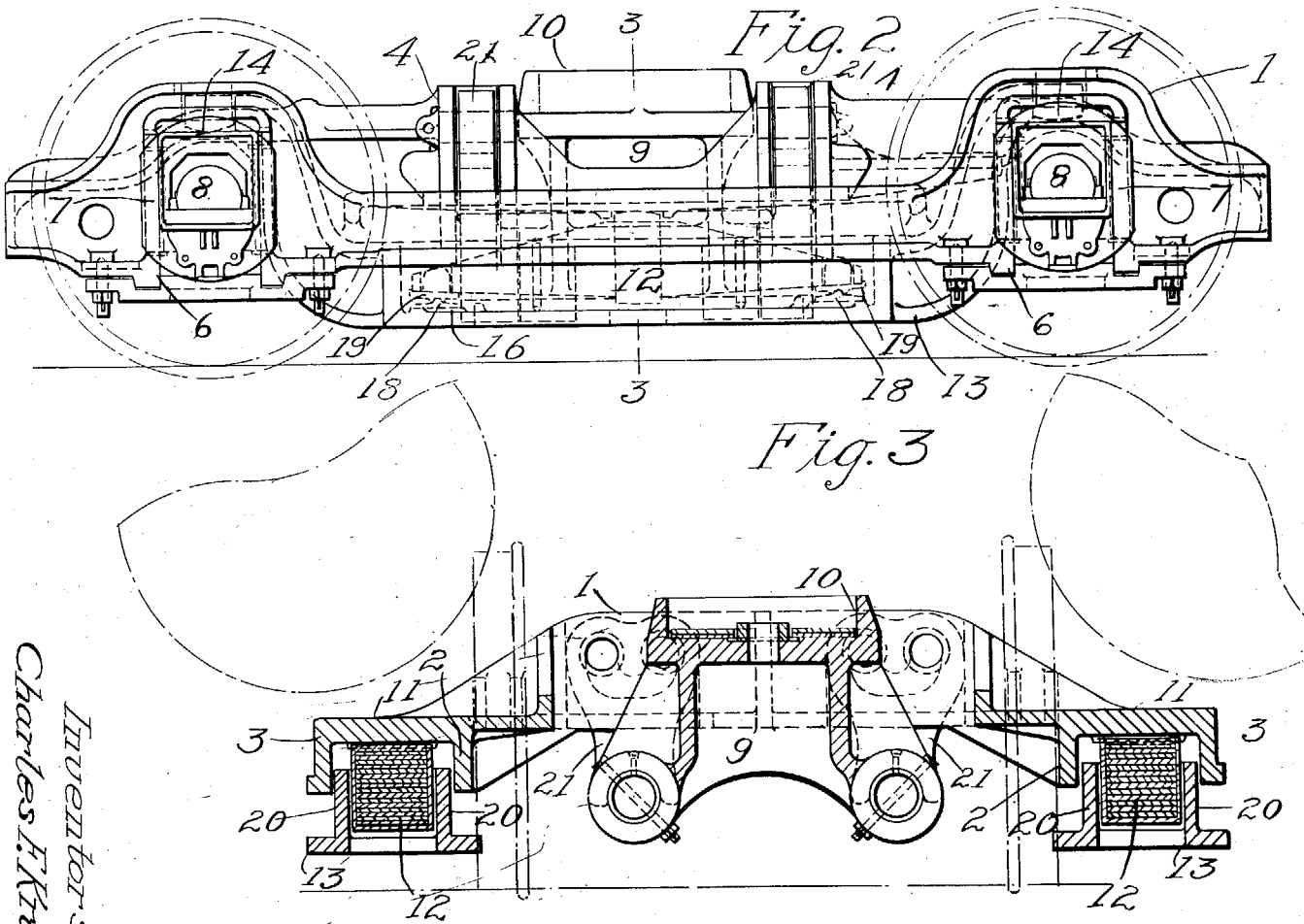
Inventors:—
Charles F. Krauss
Henry K. Harwick
by their Attorneys
Howson & Howson

C. F. KRAUSS ET AL

Aug. 5, 1930. LOCOMOTIVE TRUCK Re. 17,764

3 Sheets-Sheet 3

Original Filed April 2, 1929

Inventors:-
Charles F. Krauss
Henry K. Harwick
by their Attorneys
Howson & Howson Reissued Aug. 5, 1930 Re. 17,764

UNITED STATES PATENT OFFICE

CHARLES F. KRAUSS, OF AMBLER, AND HENRY K. HARWICK, OF DARBY, PENNSYLVANIA

LOCOMOTIVE TRUCK

Original No. 1,750,527, dated March 11, 1930, Serial No. 351,964, filed April 2, 1929. Application for reissue filed June 19, 1930. Serial No. 462,385.

This invention relates particularly to the four-wheel trucks of locomotives, in which the axles have outside bearings.

The object of the invention is to so design the frame of the truck and to locate the side spring that they will clear the locomotive cylinders.

The invention also relates to certain details of construction described hereinafter.

In the accompanying drawings:

Fig. 2 is a side view;

Fig. 3 is a transverse sectional view on the line 3—3, Fig. 2;

Figure 1:
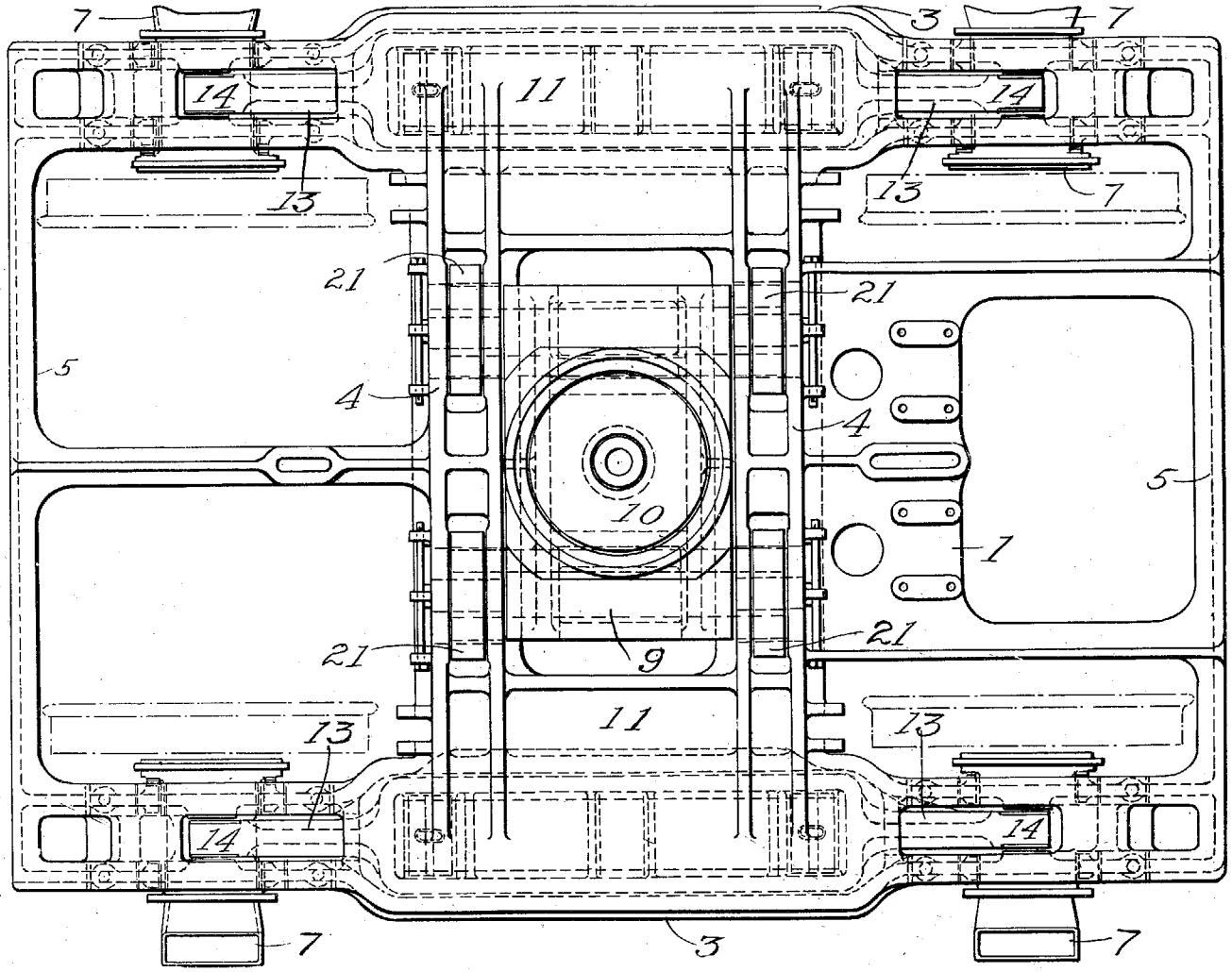
Fig. 1 is a plan view of our improved four-wheeled truck.

1 is the truck frame, made as an integral casting and consisting of double side members 2 and 3, cross-ties 4, and end members 5. The pedestals 6 for the axle boxes 7 are formed on both side members of the frame. The axles 8 are located in the boxes as shown in Fig. 2.

Suspended by links 21 from the cross-ties 4 of the frame is the bolster 9 on which is formed the centre bearing 10 of the usual construction.

The two side members 2 and 3 at each side of the truck frame 1 are connected at the top by a web 11, which forms a seat for the spring 12, which is of the semi-elliptic type in the present instance.

An equalizing beam and spring cradle 13 is located in the space between the two side members 2 and 3 of the frame 1. This beam extends over and rests upon the boxes 7 located between the pedestals of the frame 1. The ends 14 of the beam are rounded as shown to allow the beam to freely rock on the boxes.

Figure 6:
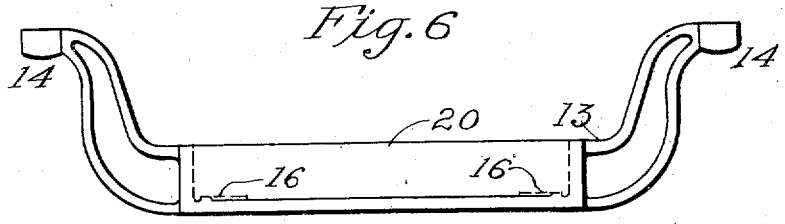
Fig. 6 is a side view of one of the equalizing beams.
Figure 7:
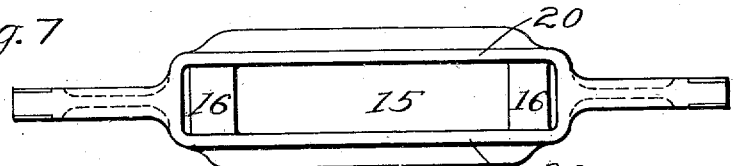
Fig. 7 is a plan view of the equalizing beam.
Figure 4:
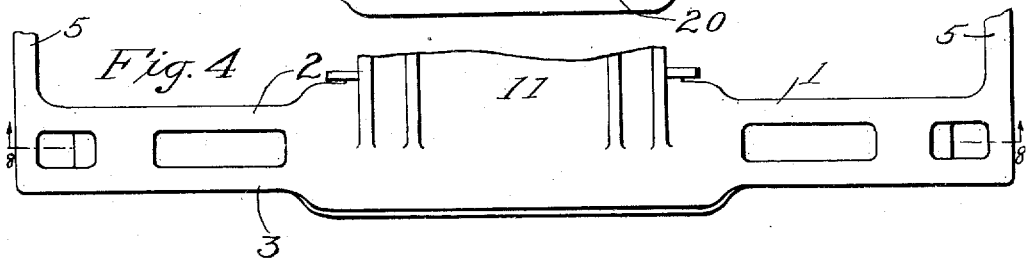
Fig. 4 is a plan view of one side of the truck.
Figure 5:
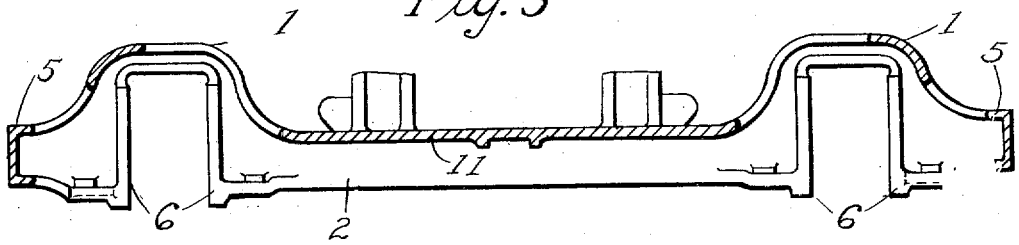
Fig. 5 is a sectional view on the line 8—8, Fig. 4.
Figure 8:
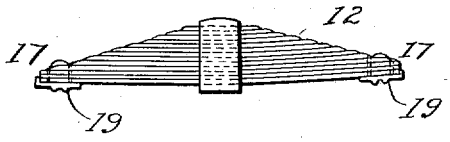
Fig. 8 is a detached side view of one of the semi-elliptic springs.

The equalizing beams 13 are made as shown in Figs. 6 and 7 and have an elongated opening 15 therein, and at each end of the spring are seats 16 for the ends 17 of the spring 12. On each seat is a seat-block 18 having a rib fitting a recess in a shoe 19 secured to the spring.

In the present instance the side walls 20 of the equalizing beam 13 are extended as shown in Fig. 3, so as to project into the recess formed by the two side members of the frame, so that they telescope with said frame and form an enclosure for the spring.

The sides of the truck frame between the two sets of pedestals are much lower than the centre thereof, as shown in Fig. 3, and the springs are located very low. The equalizing beams that support the springs are depressed at the centre. This construction allows the springs to be properly supported by the beams, and in turn to properly support the frame. Furthermore, the springs are protected by the frame and the equalizing beams as shown in Fig. 2.

By designing the truck in the manner described, it can be used under locomotives having large cylinders, the lower portions of which occupy the space formed by depressing the side members of the truck frame and their connected parts.

The bearing boxes may be provided with the ordinary hexagonal bearings as shown in Fig. 2 or with roller bearings, as desired.

We claim:—

1. The combination in a four-wheeled truck, of a frame made as an integral casting and having two side members at each side thereof; cross-ties and end connecting members; pedestals for axle boxes, said members being connected by a web at the centre; an equalizing beam located below the opening in the frame and extending into the opening and having portions extending above and resting upon the boxes, said beam having spring seats; and a spring, the ends of which rest upon the spring seats and the centre of which is adapted to a seat in the frame.

2. The combination in a four-wheeled truck, of a frame having a body portion and pedestals for axles; two side members spaced apart and depressed below the tops of the axle boxes; depressed equalizing beams, each beam located in the depressed portions of the side members and extending between the side members at each end and resting upon the boxes; spring seats on the beam; and a spring located on the spring seats and carrying the frame.

3. The combination in a four-wheeled truck, of a frame having two depressed side members at each side; a web at their upper edges forming a recess; an equalizing beam depressed at its centre, the ends being extended to rest upon the tops of axle boxes, the beam having a cavity therein; spring seats at each end of the cavity, the sides of the beam being extended into the recess of the frame; and a spring located on the spring seats and supporting the frame, the side members of the frame and the sides of the beam enclosing the spring.

4. An equalizing beam for a four-wheeled truck, having a depressed central portion open at the centre, and having spring seats at each end of the open centre upon which a spring can be mounted.

5. The combination in a four-wheeled truck, of a frame having two sets of pedestals and having inner and outer side members spaced apart and connected at the upper end by a web; a box mounted between the pedestals of each set; equalizing beams located in the space between the side members and extending under the web and over the boxes; and a semielliptic spring mounted longitudinally on the beam and supporting the truck frame, the beam and the side members of the frame enclosing the said spring.

CHARLES F. KRAUSS.
HENRY K. HARWICK.